United States Patent Office 2,948,756
Patented Aug. 9, 1960

2,948,756

TEREPHTHALALDEHYDE PREPARATION

Irving S. Bengelsdorf, Schenectady, N.Y., assignor to General Electric Company, a corporation of New York No Drawing. Filed Mar. 29, 1957, Ser. No. 649,322

1 Claim. (Cl. 260—599)

This invention relates to the preparation of terephthalaldehyde. More particularly, this invention relates to the preparation of terephthalaldehyde

by the oxidation of p-xylene dichloride

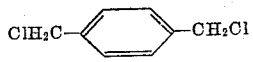

with dilute nitric acid.

Heretofore, a number of workers have oxidized p-xylylene dichloride with nitric acid. However, in every case the conditions of the reaction have been such that the major reaction products were terephthalaldehydic acid

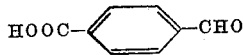

and terephthalic acid. Generally, these prior art oxidation reactions yielded no terephthalaldehyde because of the relatively high concentration of nitric acid solutions employed in the prior art.

It is an object of the present invention to provide a method for preparing terephthalaldehyde in a single stage operation, under mild reaction conditions, and with a reasonable yield of product.

The process of the present invention is based on my discovery that p-xylylene dichloride may be oxidized with dilute aqueous nitric acid to form terephthalaldehyde as the major reaction product.

The aqueous nitric acid solutions employed in the practice of the present invention contain less than 20 percent by weight of nitric acid. Preferably, I employ from about 5 to 19 percent by weight aqueous solutions of nitric acid to oxidize the p-xylylene dichloride. My preferred specific nitric acid concentration is about 10 percent.

The process of the present invention is carried out by mixing the p-xylylene dichloride and the aqueous nitric acid and subsequently heating and agitating the reaction mixture. The reaction is carried out satisfactorily at atmospheric pressure, and temperatures of from about 75 to 110° C. may be employed. My preferred operating temperature is the atmospheric pressure reflux temperature of the p-xylylene dichloride-nitric acid solution, which varies from about 102 to 110° C. depending on the concentration of nitric acid and on the relative amounts of the reactants. By carrying out the reaction at reflux temperature, refluxing of the reaction mixture provides the agitation desirable in the reaction. While I prefer to use atmospheric pressure, subatmospheric or superatmospheric pressure may also be employed.

The relative amounts of nitric acid and p-xylylene dichloride employed may vary within wide limits. Thus, satisfactory results are obtained employing from about 2 to 50 moles of nitric acid per mole of the dichloride. However, I prefer to use about 10 moles of nitric acid per mole of the dichloride.

The time of the reaction may also vary within wide limits. However, there is a certain optimum reaction time depending on the particular reaction mixture employed. Generally, the optimum reaction time is from about 5 to 7 hours for maximum yields of terephthalaldehyde. If reaction times in excess of about 7 hours are employed, the yield of terephthalaldehyde begins to decrease. During the initial stages of my process, copious fumes of nitrogen dioxide are evolved; and after several hours of reflux, a solid material appears. At the end of the reaction period the reaction mixture is cooled to room temperature to cause deposition of a mass of colorless crystals. These colorless crystals are filtered from the reaction mixture and the filtrate is evaporated to dryness leaving a residue. The crystals and the residue represent terephthalaldehyde as well as some terephthalaldehydic acid and terephthalic acid which are also formed during the reaction. These crystals and the residue are combined and suspended in aqueous NaHCO₃. The concentration of this aqueous sodium bicarbonate solution is not critical. Satisfactory solution has been obtained employing about twenty parts of a five percent aqueous sodium bicarbonate solution per part of the crystals and the residue. This sodium bicarbonate suspension is evaporated to dryness and the resulting residue is then mixed with ether. Since terephthalaldehyde is soluble in ether, while the sodium salts of terephthalaldehydic acid and terephthalic acid are not, this results in an ether solution of terephthalaldehyde. This solution is evaporated to dryness, leaving pure crystalline terephthalaldehyde. The residue from the ether extract is acidified with hydrochloric acid to give a mixture of terephthalaldehydic acid and terephthalic acid. The terephthalaldehydic acid is then extracted from the mixture with ether and isolated by evaporation of the ether. The residue from the extraction is terephthalic acid.

My invention will be more fully described by reference to the following specific examples. It should be understood, however, that the examples are given by way of illustration only and that the invention is not to be limited by the details set forth therein. Yields described in the examples are based on the amount of product theoretically available from the starting material.

*Example 1*

A suspension of p-xylylene dichloride in 10 percent by weight nitric acid was prepared. This solution contained sufficient nitric acid to provide 10 moles of nitric acid per mole of the p-xylylene dichloride. This mixture was heated at the reflux temperature of about 106° C. for 7 hours. At the end of this time the reaction mixture was cooled to room temperature and the reaction products were isolated as previously described. This resulted in a 56 percent yield, based on the starting p-xylene dichloride, of terephthalaldehyde (melting point 114–116° C.). The terephthalaldehyde formed a bright orange-red 2,4-dinitrophenylhydrazone. Treatment of the terephthalaldehyde with an ethanolic solution of aniline gave terephthalaldianiline having a melting point of 164–165° C. Chemical analysis of this latter derivative showed the presence of 84.4 percent carbon, 5.6 percent hydrogen and 10.1 percent nitrogen as compared with the theoretical values of 84.48 percent carbon, 5.67 percent hydrogen and 9.85 percent nitrogen. This run also produced a 23.3 percent yield, based on the starting p-xylylene dichloride, of terephthalaldehydic acid. Terephthalic acid was also obtained in this run in a 15.1 percent yield based on the starting p-xylylene dichloride.

Example 2

The procedure of Example 1 was repeated except that a 15 percent by weight aqueous nitric acid solution was employed for the oxidation. This resulted in a 36 percent yield of terephthalaldehyde, a 35 percent yield of terephthalaldehydic acid and a 16 percent yield of terephthalic acid.

Example 3

The procedure of the preceding examples was repeated except that a 19 percent by weight aqueous nitric acid solution was employed. This resulted in a 70 percent yield of terephthalaldehyde, a 23 percent yield of terephthalaldehydic acid and a 5 percent yield of terephthalic acid. When the procedure of these examples was repeated except that nitric acid having a concentration of 40 to 50 percent was employed, the yield of terephthalaldehyde was only to 3 percent while the combined yields of the terephthalaldehydic acid and the terephthalic acid was about 90 percent.

The terephthalaldehyde prepared by the method of the present invention is useful in the formation of phenol aldehyde resins. Thus, terephthalaldehyde may be reacted with phenol by the method shown in Patent 2,621,165 to form thermosetting resinous materials useful in molding applications and in various formulations.

What I claim as new and desire to secure by Letters Patent of the United States is:

The method of preparing terephthalaldehyde which comprises heating for from 5 to 7 hours p-xylylene dichloride at a temperature of from about 102 to 110° C. with nitric acid having a concentration of from 10 to 19 percent, there being employed from about 2–50 moles of nitric acid per mole of xylylene dichloride, and removing the terephthalaldehyde from the reaction mixture.

References Cited in the file of this patent

UNITED STATES PATENTS 2,740,811 Lotz _____ Apr. 3, 1956
2,788,366 Lotz _____ Apr. 9, 1957

OTHER REFERENCES

Low: Ber, Deut. Chem., vol. 18 (1885), pages 2072–2075.

Horning: Organic Syntheses, vol. III (1955), pages 788–790.

Karrer: Organic Chemistry, 4th ed. (1950), page 504.